US012746970B2

(12) United States Patent
Deshmukh et al.

(10) Patent No.: US 12,746,970 B2
(45) Date of Patent: Sep. 29, 2026

(54) ZERO TURN MOWER CRUISE CONTROL SYSTEM

(71) Applicant: Deere & Company, Moline, IL (US)

(72) Inventors: Vinesh Y. Deshmukh, Pune (IN); Bhargav R. Sarda, Jamnagar (IN); Robert D. Dunbar, Holly Springs, NC (US)

(73) Assignee: Deere & Company, Moline, IL (US)

(*) Notice: Subject to any disclaimer, the term of this patent is extended or adjusted under 35 U.S.C. 154(b) by 311 days.

(21) Appl. No.: 18/581,568

(22) Filed: Feb. 20, 2024

(65) Prior Publication Data

US 2025/0263122 A1 Aug. 21, 2025

(51) Int. Cl.

| | |
|---|---|
| ***B62D 11/02*** | (2006.01) |
| ***A01D 34/82*** | (2006.01) |
| ***A01D 69/02*** | (2006.01) |
| ***B60K 31/00*** | (2006.01) |
| *A01D 101/00* | (2006.01) |

(52) U.S. Cl.

CPC ............ *B62D 11/02* (2013.01); *A01D 34/824* (2013.01); *A01D 69/025* (2013.01); *B60K 31/00* (2013.01); *A01D 2101/00* (2013.01)

(58) Field of Classification Search

CPC .............................. A01D 34/824; B62D 11/02

See application file for complete search history.

(56) References Cited

U.S. PATENT DOCUMENTS

| | | | | |
|---|---|---|---|---|
| 5,168,970 A * | 12/1992 | Hough | B60K 31/02 188/161 |
| 6,161,637 A | 12/2000 | Decker et al. | |
| 9,538,706 B2 | 1/2017 | Haun | |
| 2004/0079077 A1* | 4/2004 | Yano | F16H 61/423 60/487 |
| 2008/0092331 A1* | 4/2008 | Matsumoto | B60N 3/02 16/112.1 |
| 2015/0308569 A1* | 10/2015 | Heathcoat, Jr. | B62D 6/02 701/41 |
| 2016/0302356 A1* | 10/2016 | Haun | B62D 11/24 |
| 2017/0120922 A1* | 5/2017 | Schaedler | B62D 3/12 |

(Continued)

OTHER PUBLICATIONS

Extended European Search Report and Written Opinion issued in European Patent Application No. 25157632.8 dated Jul. 17, 2025, in 10 pages.

(Continued)

*Primary Examiner* — Jess Whittington

(57) ABSTRACT

A ZTR mower cruise control system comprising a pair of motion control levers coupled to drives that rotate rear drive wheels at a velocity. A pair of front wheels that are pivoted to steering angles corresponding to any difference between the positions of the levers. A position sensor positioned to provide a signal based on the position of the levers. A controller configured to receive the signal, receive an operator input corresponding to an activation of a cruise control mode, maintain the steering angles at a current position, receive an updated position of the levers from the position sensor after a change in the position of at least one of the levers, maintain the steering angles at an updated position and receive an operator input corresponding to a deactivation of the cruise control mode and cease maintaining the steering angles.

19 Claims, 6 Drawing Sheets

(56) References Cited

U.S. PATENT DOCUMENTS

| | | | | |
|---|---|---|---|---|
| 2017/0192546 | A1* | 7/2017 | Park | G06F 3/03543 |
| 2019/0075724 | A1* | 3/2019 | Becke | A01D 34/006 |
| 2020/0205338 | A1* | 7/2020 | Zeiler | A01D 34/008 |
| 2020/0361587 | A1* | 11/2020 | Husberg | B63H 5/125 |
| 2021/0191403 | A1* | 6/2021 | Rastoll | G05D 1/0016 |
| 2022/0287218 | A1* | 9/2022 | Yuasa | G05D 1/648 |
| 2022/0379947 | A1 | 12/2022 | Winter et al. | |

OTHER PUBLICATIONS

Cub Cadet 60" 24HP Riding Lawn Mower—ZT2 60, pp. 1-7, [online], [retrieved on Jun. 15, 2023]. Retrieved from the Internet <URL: https://www.farmandfleet.com/products/1221923-cub-cadet-60-24hp-riding-lawn-mower.html>.

* cited by examiner

ZERO TURN MOWER CRUISE CONTROL SYSTEM

FIELD OF THE DISCLOSURE

This disclosure relates generally to grass mowing machines, and specifically to a zero turn mower cruise control system.

BACKGROUND OF THE DISCLOSURE

Grass mowing machines known as zero turning radius ("ZTR") mowers have at least one independently powered rear drive wheel on each side of a frame. Many ZTR mowers have a twin stick control system. A pair of motion control levers or sticks may be provided side-by-side, with each lever or stick controlling one of the rear drive wheels. When both levers or sticks are advanced together forwardly out of their neutral position, both rear drive wheels rotate forwardly to cause the ZTR mower to move forward. A ZTR mower may be steered by advancing one lever or stick more than the other.

Typically, each motion control lever or stick on a ZTR mower maybe linked to a pump arm of one of two separate hydraulic pumps, or of a dual hydraulic pump; i.e., a separate pump for each rear drive wheel. The lever or stick may be used to move a pump swash plate through a direct linkage.

SUMMARY OF THE DISCLOSURE

A zero turn mower cruise control system for a zero turn mower is disclosed. The zero turn mower comprises a pair of motion control levers, each lever is coupled to a drive that rotates a rear drive wheel at a velocity corresponding to the position of the lever. A pair of front wheels are pivoted to steering angles corresponding to any difference between the positions of the pair of motion control levers. A position sensor is positioned to provide a signal based on the position of the pair of motion control levers. The zero turn mower cruise control system comprises a controller that is configured to receive the signal, receive an operator input corresponding to an activation of a cruise control mode, maintain the steering angles at a current position, receive an updated position of the pair of motion control levers from the position sensor after a change in the position of at least one of the pair of motion control levers, maintain the steering angles at an updated position, and receive an operator input corresponding to a deactivation of the cruise control mode and cease maintaining the steering angles.

A zero turn mower cruise control system for a zero turn mower is disclosed. The zero turn mower comprises a pair of motion control levers, each lever is coupled to a drive that rotates a rear drive wheel at a velocity corresponding to the fore and aft position of the lever. A pair of front wheels are pivoted to steering angles corresponding to any difference between the fore and aft positions of the pair of motion control levers. A position sensor is positioned to provide a signal based on the fore and aft position of the pair of motion control levers. The zero turn mower cruise control system comprises a controller that is configured to receive the signal, receive an operator input corresponding to an activation of a cruise control mode, maintain the velocity of each rear drive wheel at a current velocity for each rear drive wheel, receive an updated position of the pair of motion control levers from the position sensor after a change in the fore and aft position of at least one of the pair of motion control levers, maintain the velocity of each rear drive wheel at an updated velocity for each rear drive wheel, and receive an operator input corresponding to a deactivation of the cruise control mode and cease maintaining the velocity.

A method of operating a zero turn mower cruise control system of a zero turn mower is disclosed. The method comprises receiving a signal from a position sensor indicative of a fore and aft position of a pair of motion control levers, each lever coupled to a drive that rotates a rear drive wheel at a velocity corresponding to the fore and aft position of the lever, receiving an operator input corresponding to an activation of a cruise control mode, maintaining the velocity of each rear drive wheel at a current velocity for each rear drive wheel, receiving a signal from the position sensor indicative of an updated position of the pair of motion control levers after a change in the fore and aft position of at least one of the pair of motion control levers, maintaining the velocity of each rear drive wheel at an updated velocity for each rear drive wheel, and receiving an operator input corresponding to a deactivation of the cruise control mode and ceasing to maintain the velocity.

DETAILED DESCRIPTION

Figure 1:
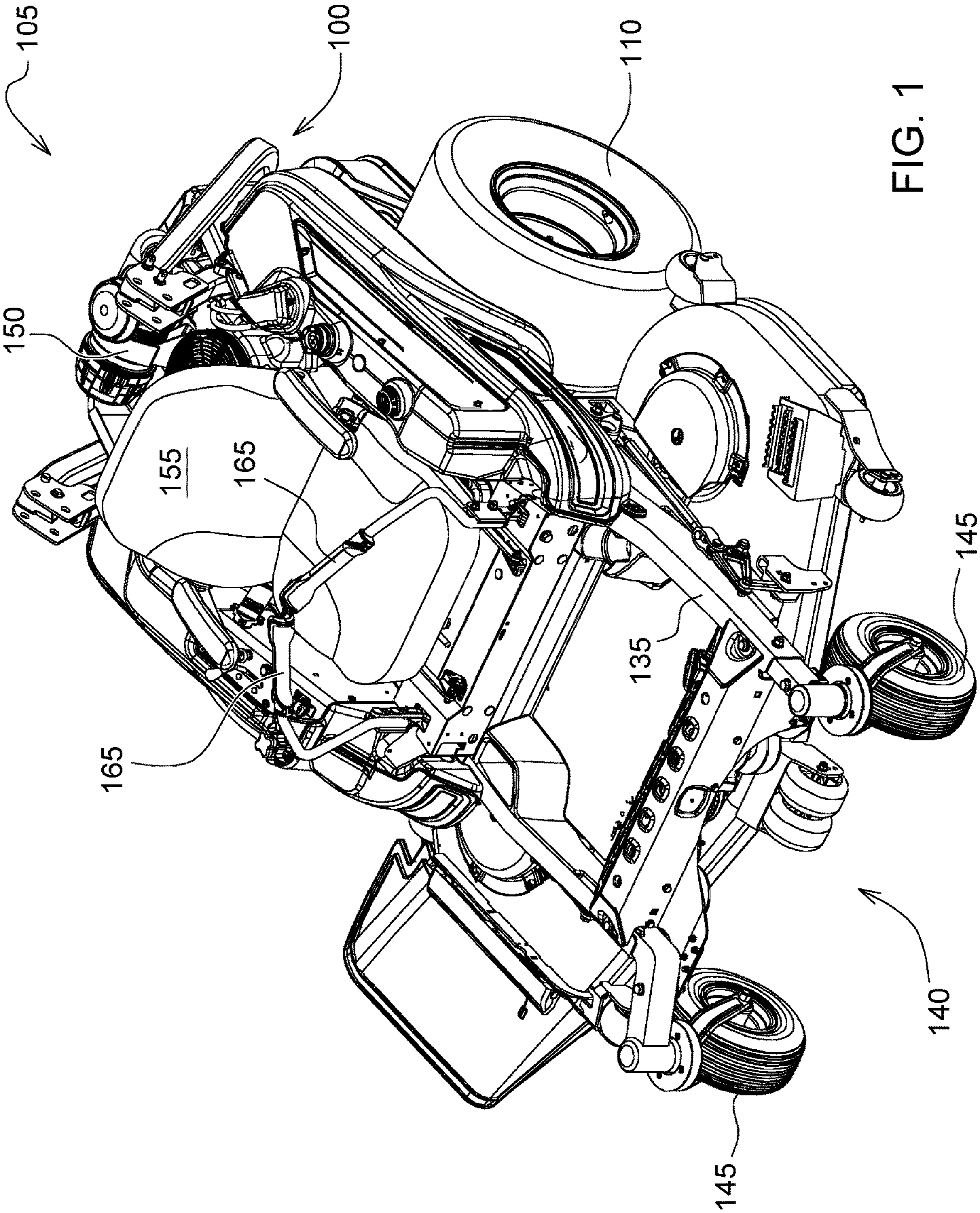
FIG. 1 is a top perspective view of a ZTR mower with a ZTR cruise control system according to one embodiment.
Figure 2:
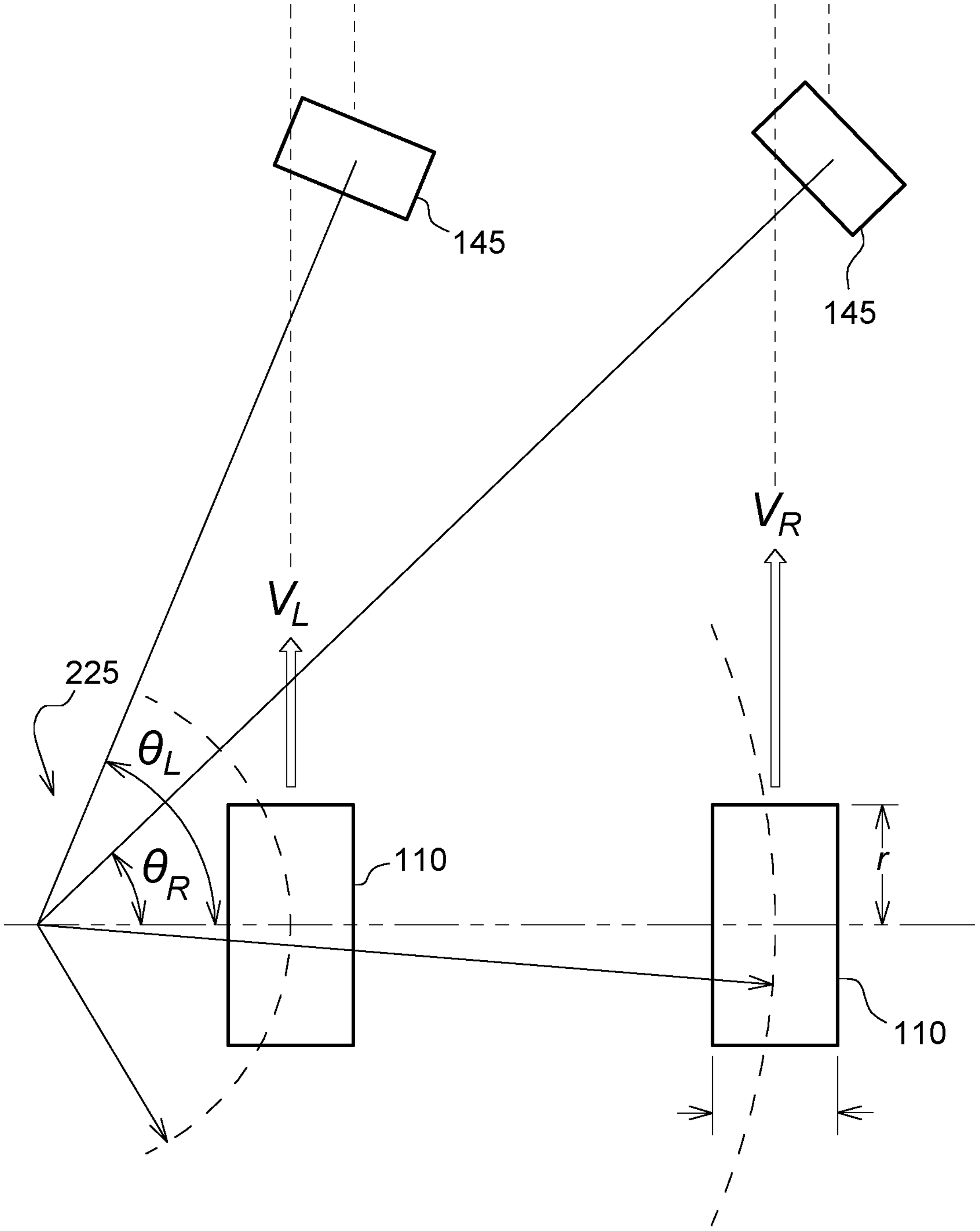
FIG. 2 is a top view of the geometry used for a ZTR mower steering according to one embodiment.
Figure 3:
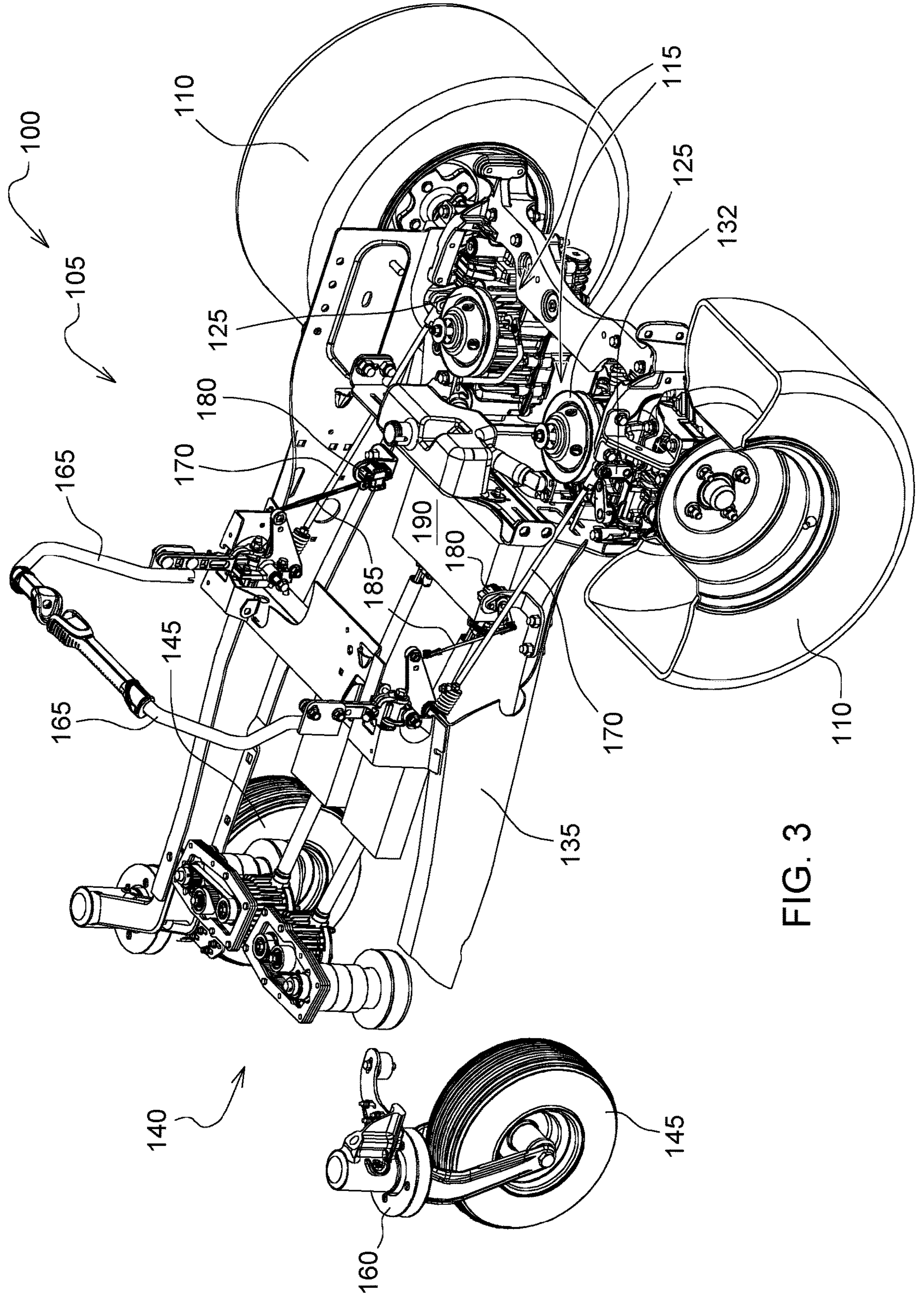
FIG. 3 is a rear perspective view of a ZTR mower with a ZTR cruise control system, with some parts removed, according to one embodiment.
Figure 5:
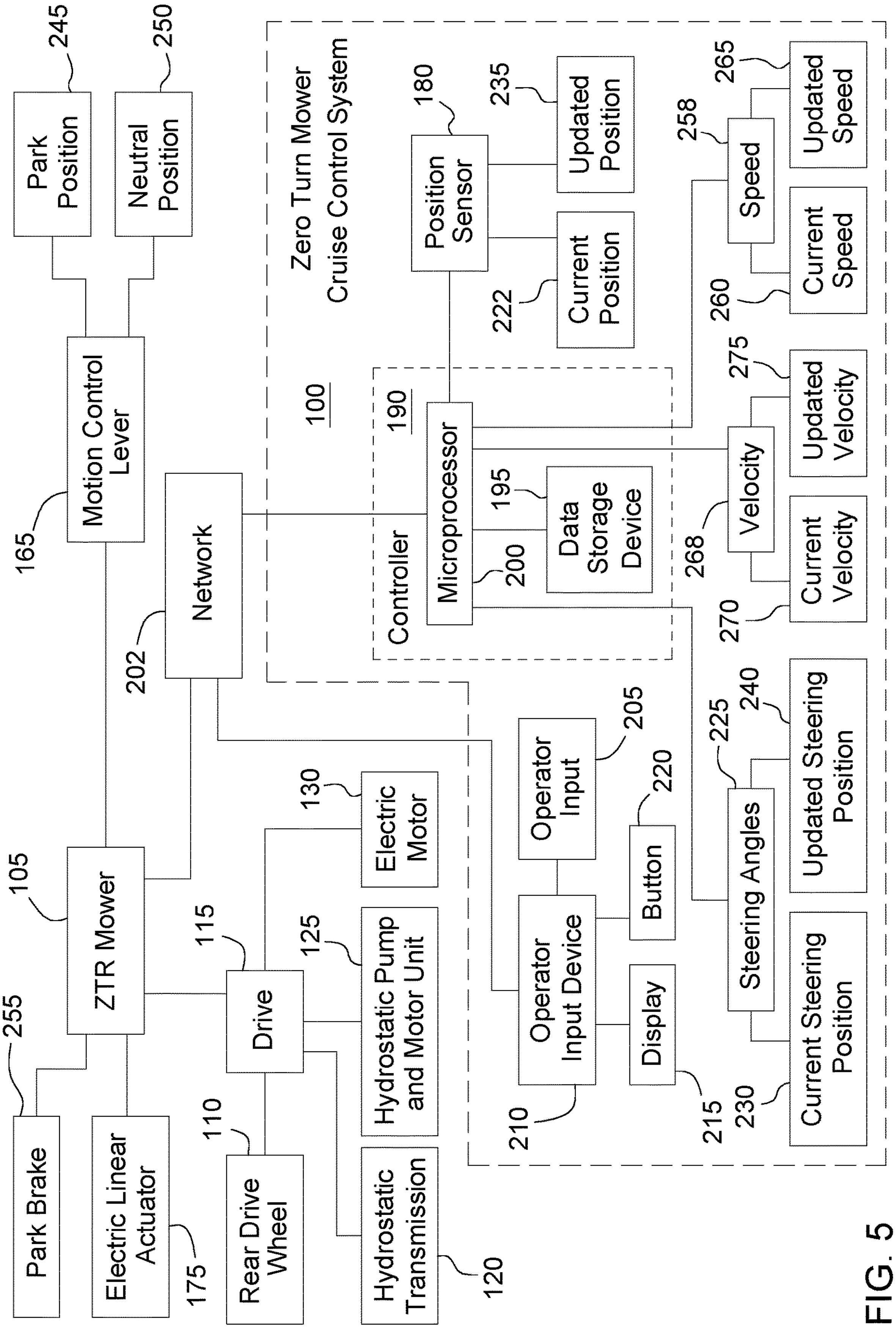
FIG. 5 is a schematic of a ZTR mower with a ZTR mower cruise control system.

FIGS. 1-3 show one embodiment of a ZTR mower cruise control system 100 on a ZTR mower 105 having a pair of rear drive wheels 110 that are independently powered so that each rear drive wheel 110 rotates independently of the other rear drive wheel 110. Each rear drive wheel 110 may be powered by a drive 115 that may be independent from the other drive 115 and may be a hydrostatic transmission 120 (FIG. 5), an integrated hydrostatic pump and motor unit 125, an electric motor 130 (FIG. 5), or other device. Each hydrostatic pump may have a swash plate 132 that may define a pump stroke between a full forward position, a neutral position, and a reverse position.

Figure 4:
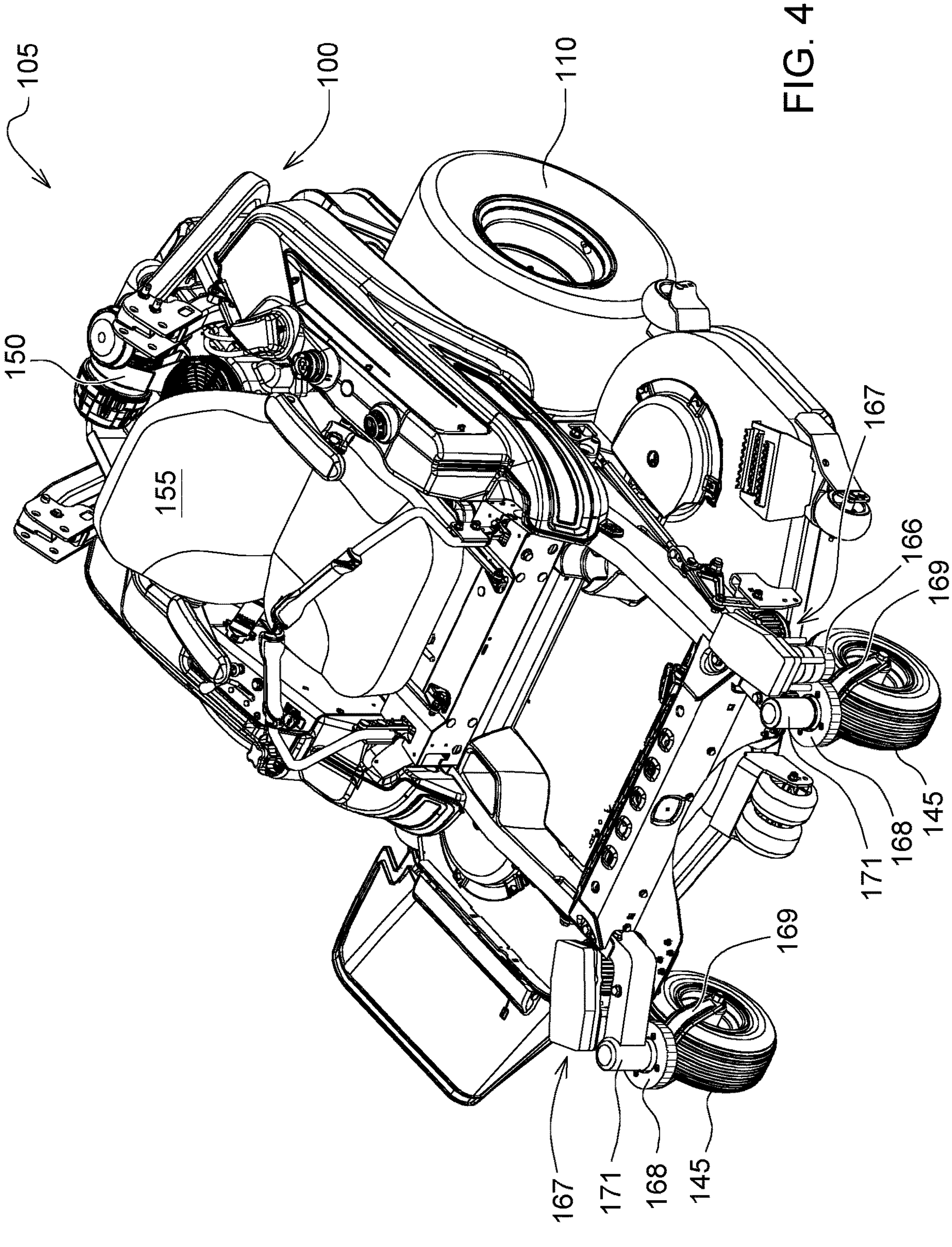
FIG. 4 is a front perspective view of a mechanical linkage of a ZTR mower steering system according to a second embodiment.

The ZTR mower 105 may have a frame 135 supported on a forward portion 140 by front wheels 145, and a rear mounted engine 150 behind operator seat 155. The front wheels 145 may be on casters 160 and spin freely or into a position that results from a velocity of each rear drive wheel 110. The seat 155 may be mounted over the frame 135 for a seated operator to use left and right motion control levers or sticks 165. The front wheels 145 may be pivoted corresponding to any difference between fore and aft positions or other positions of the pair of motion control levers 165. Alternatively, the pair of motion control levers 165 may be a single joystick. The front wheels 145 may be positioned straight and thus not pivoted if the pair of motion control levers 165 are both positioned in the fore and aft positions the same amount. In an alternative embodiment depicted in FIG. 4, the front wheels 145 may be actively controlled via a first gear 166 rotated by an electronic steering actuator 167, meshing with a second gear 168 mounted to a fork 169 that supports the front wheel 145 to pivot on a vertical spindle 171.

The left and right motion control levers 165, or a single joystick, may be mounted on the ZTR mower 105 and may be pivotable between forward (fore), neutral, and reverse (aft) positions. Each motion control lever 165 may be mounted to the ZTR mower 105 so that each lever 165 may rest in a neutral slot. Each motion control lever 165 may be removed from the neutral slot by moving each motion control lever 165 slightly inwardly towards an operator to clear the neutral slot. Once each motion control lever 165 is out of the neutral slot it is in a neutral band. Once each motion control lever 165 is out of the neutral slot it will stay in the neutral band unless it is moved by the operator. Each motion control lever 165 may be placed back in the neutral slot by moving each motion control lever 165 to the neutral band and then away from the operator. Each motion control lever 165 may pivot forwardly to a forward band to move a swash plate 132 in the hydrostatic pump in a first direction to cause a rear drive wheel 110 to rotate forward or pivot rearwardly to a reverse band to move the swash plate 132 in a second direction to cause the rear drive wheel 110 to rotate backward. Each motion control lever 165 may have a neutral position 250 in which the corresponding rear drive wheel 110 will come to rest. The neutral position 250 is in the neutral band. The pair of motion control levers 165 may be mounted adjacent or in front of the operator's seat 155 on a ZTR mower 105 and may be connected to the hydrostatic pump by a rod 170. Alternatively, the ZTR mower 105 may include an electric linear actuator 175 that is coupled to a hydrostatic valve that controls the rear drive wheel 110.

The ZTR mower cruise control system 100 may include a position sensor 180 for each motion control lever 165 or one position sensor 180 that monitors both levers 165. The position sensors 180 may be rotary potentiometers that provide signals that vary with the position of a sensor lever. A rod 185 may connect each motion control lever 165 to its respective sensor lever. Each position sensor 180 may provide an electrical signal based on the forward, neutral or reverse position of the motion control lever 165. The angular velocities ($\omega_L$ and $\omega_R$) of each rear drive wheel 110 may be directly proportional to the position of each motion control lever 165. Therefore, electrical signals indicating the motion control lever 165 positions may correspond to and provide the same result as rear drive wheel 110 angular velocities.

The ZTR mower cruise control system 100 may include a controller 190 having a data storage device 195 and a microprocessor 200. The ZTR mower cruise control system 100, and/or the controller 190, may communicate with the ZTR mower 105 over a network 202 such as a CAN bus. The data storage device 195 may be configured for storing instructions that are executable by the microprocessor 200 to cause the microprocessor 200 to receive the motion control lever 165 position signals or the rear drive wheel 110 angular velocities. The controller 190 may use the positions of the motion control levers 165, or the angular velocities ($\omega_L$ and $\omega_R$) of the left and right rear drive wheels 110, to determine the linear velocities ($V_L$ and $V_R$) of the left and right rear drive wheels 110, where r is the tire radius, $V_L$=r $\omega_L$ and $V_R$=r $\omega_R$.

An operator may provide an operator input 205 corresponding to an activation of a ZTR cruise control mode using an operator input device 210 such as a display 215 coupled the ZTR mower 105 or an operator input device 210, such as a button or switch 220, coupled to at least one of the motion control levers 165. The operator input 205 may be received by the controller 190. The ZTR cruise control mode may include maintaining a direction, a speed, or both a direction and speed of the ZTR mower 105. Once the ZTR cruise control mode is activated, the operator may release the motion control levers 165 and they will remain in the neutral band.

For maintaining a direction or steering angles 225, once the ZTR mower cruise control mode is activated, the controller 190 will receive a current position 222 of the pair of motion control levers 165, or the angular velocities ($\omega_L$ and $\omega_R$) of the left and right rear drive wheels 110, and maintain the steering angles 225 at a current steering position 230 for both the left front wheel steering angle $\theta_L$ and the right front wheel steering angle $\theta_R$. This may be done by maintaining the direction, or individual speed, of each rear drive wheel 110. For example, any change in speed of the ZTR mower 105 would be implemented with a proportionate change in speed of the rear drive wheels 110 in order to maintain the same course of direction of the ZTR mower 105. In another aspect, the electric linear actuator 175 may be in communication with the controller 190 and when the controller 190 receives an operator input 205 corresponding to an activation of the ZTR cruise control mode, the current hydrostatic valve position may be locked. In yet another aspect, the electronic steering actuator 167 may be in communication with the controller 190 and may be controlled to maintain the direction by maintaining a current setting.

The controller 190 may receive an updated position 235 of the pair of motion control levers 165 from the position sensor 180 once the pair of motion control levers 165 are removed from the neutral band due to a change in the fore and aft position, or other change in position, of at least one of the pair of motion control levers 165. The controller 190 may then temporarily maintain the steering angles 225 at an updated steering position 240, which may add or subtract from the current steering position 230. Alternatively, the controller 190 may ignore the change in the fore and aft position of at least one of the pair of motion control levers 165 until the pair of motion control levers 165 are first placed in a neutral position 250. The controller 190 may temporarily maintain the steering angles 225 at the updated steering position 240 unless the operator provides an operator input 205 corresponding to a second activation of a ZTR cruise control mode using an operator input device 210 again to make the updated steering position 240 permanent unless the ZTR cruise control mode is later deactivated. The operator may bring the ZTR mower 105 to a sudden stop by pulling the motion control levers 165 all the way back to the reverse band. This will not disable the ZTR cruise control mode. The operator can also make an end of pass turn without disabling the ZTR cruise control mode.

The controller 190 may receive an operator input 205 corresponding to a deactivation of the ZTR mower cruise control system 100 or mode and cease maintaining the steering angles 225. The operator input 205 may include using an operator input device 210 such as the display 215 or the button 220. The operator input 205 may also include shifting the pair of motion control levers 165, or single joystick, to a park position 245 or actuating a park brake 255 that also signals to the controller 190 to deactivate the ZTR mower cruise control system 100 or mode.

For maintaining a speed, once the ZTR mower cruise control mode is activated, the controller 190 may be configured to maintain a speed 258 of the ZTR mower 105 at a current speed 260. The controller 190 may maintain the current speed 260 by maintaining the speed of the rear drive wheels 110 by controlling the drives 115. The controller 190 may receive an updated position 235 of the pair of motion control levers 165 from the position sensor 180 once the pair of motion control levers 165 are removed from the neutral band due to a change in the fore and aft position, or other change in position, of at least one of the pair of motion control levers 165. The controller 190 may then temporarily maintain the speed 258 at an updated speed 265, which may add or subtract from the current speed 260, by maintaining the speed of the rear drive wheels 110 by controlling the drives 115. Alternatively, the controller 190 may ignore the change in the fore and aft position of at least one of the pair of motion control levers 165 until the pair of motion control levers 165 are first placed in a neutral position 250. The controller 190 may temporarily maintain the speed 258 at the updated speed 265 unless the operator provides an operator input 205 corresponding to a second activation of a ZTR cruise control mode using an operator input device 210 again to make the updated speed 265 permanent unless the ZTR cruise control mode is later deactivated. The operator may bring the ZTR mower 105 to a sudden stop by pulling the motion control levers 165 all the way back to the reverse band. This will not disable the ZTR cruise control mode. The operator can also make an end of pass turn without disabling the ZTR cruise control mode.

The controller 190 may also receive an operator input 205 corresponding to a deactivation of the ZTR cruise control mode and cease maintaining the speed 258. The display 215 is also configured to receive the operator input 205 to increment or decrement the speed 258.

In another embodiment, steering angles 225 may be maintained to maintain direction and speed 258 may also be maintained such that velocity 268 is maintained. In this embodiment, each motion control lever 165 may be coupled to a drive 115 that rotates a rear drive wheel 110 at a velocity corresponding to the fore and aft position of the lever 165. A pair of front wheels 145 may be pivoted to steering angles 225 corresponding to any difference between the fore and aft positions of the pair of motion control levers 165. A position sensor 180 may be positioned to provide a signal based on the fore and aft position of the pair of motion control levers 165. A controller 190 may be configured to receive the signal, or the angular velocities ($\omega_L$ and $\omega_R$) of the left and right rear drive wheels 110, receive an operator input 205 corresponding to an activation of a cruise control mode, and maintain a velocity 268 of each rear drive wheel 110 at a current velocity 270 for each rear drive wheel 110. The controller 190 may also receive an updated position 235 of the pair of motion control levers 165 from the position sensor 180 once the pair of motion control levers 165 are removed from the neutral band due to a change in the fore and aft position of at least one of the pair of motion control levers 165 and temporarily maintain the velocity of each rear drive wheel 110 at an updated velocity 275, which may add or subtract from the current velocity 270 unless the operator provides an operator input 205 corresponding to a second activation of a ZTR cruise control mode using an operator input device 210 again to make the updated velocity 275 permanent unless the ZTR cruise control mode is later deactivated. The operator may bring the ZTR mower 105 to a sudden stop by pulling the motion control levers 165 all the way back to the reverse band. This will not disable the ZTR cruise control mode. The operator can also make an end of pass turn without disabling the ZTR cruise control mode. The controller 190 may receive an operator input 205 corresponding to a deactivation of the cruise control mode and cease maintaining the velocity 268.

Figure 6:
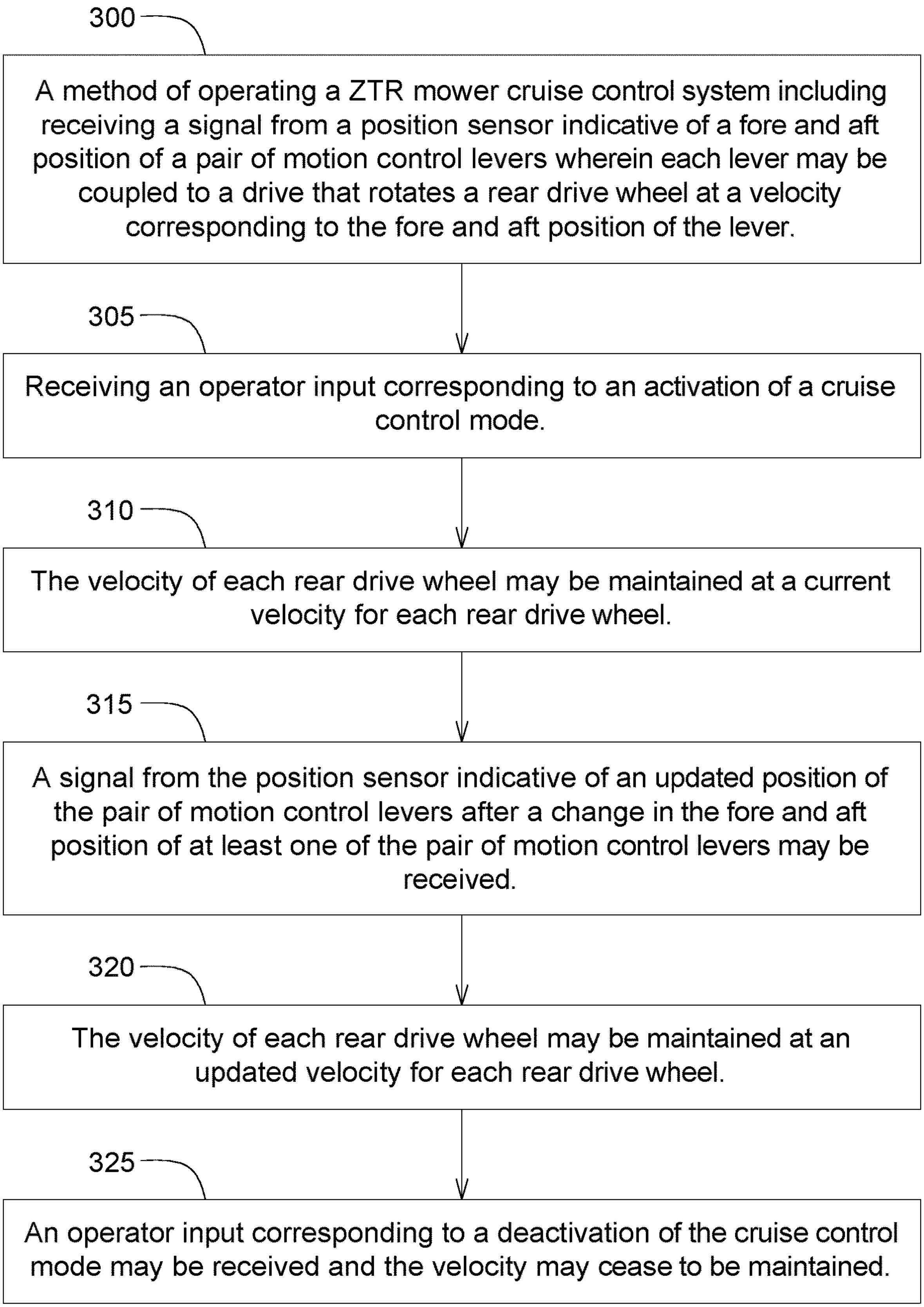
FIG. 6 is a flow chart of a method of operating a zero turn mower cruise control system of a zero turn mower.

Referring to FIG. 6, a method of operating a ZTR mower cruise control system 100 of a ZTR mower 105 is disclosed. In step 300, a signal is received from a position sensor 180 indicative of a fore and aft position of a pair of motion control levers 165 wherein each lever 165 may be coupled to a drive 115 that rotates a rear drive wheel 110 at a velocity corresponding to the fore and aft position of the lever 165.

In step 305 an operator input 205 corresponding to an activation of a cruise control mode may be received. In step 310, the velocity of each rear drive wheel 110 may be maintained at a current velocity 270 for each rear drive wheel 110.

In step 315, a signal from the position sensor 180 indicative of an updated position 235 of the pair of motion control levers 165 after a change in the fore and aft position of at least one of the pair of motion control levers 165 may be received. In step 320, the velocity of each rear drive wheel 110 may be maintained at an updated velocity 275 for each rear drive wheel 110. In step 325, an operator input 205 corresponding to a deactivation of the cruise control mode may be received and the velocity may cease to be maintained.

What is claimed is:

1. A zero turn mower comprising:

a pair of motion control levers, each lever coupled to a drive that rotates a rear drive wheel at a velocity corresponding to the position of the lever;

a pair of front wheels that are pivoted to steering angles corresponding to any difference between the positions of the pair of motion control levers;

a position sensor positioned to provide a signal based on the position of the pair of motion control levers; and a zero turn mower cruise control system comprising a controller configured to:

receive the signal;

receive an operator input corresponding to an activation of a cruise control mode;

maintain the steering angles at a current position by maintaining the velocity of each of the rear drive wheels at a current velocity;

receive an updated position of the pair of motion control levers from the position sensor after a change in the position of at least one of the pair of motion control levers from a neutral position;

receive another operator input corresponding to a second activation of the cruise control mode and maintain the steering angles at an updated position by maintaining the velocity of each of the rear drive wheels at an updated velocity;

receive another updated position of the pair of motion control levers from the neutral position and maintain the steering angles at the updated position by maintaining the velocity of each of rear drive wheel until the pair of motion control levers are returned to the neutral position and then maintain the velocity of each rear drive wheel at the updated velocity; and receive an operator input corresponding to a deactivation of the cruise control mode and cease maintaining the steering angles.

2. The zero turn mower of claim 1, wherein the drive is a hydrostatic transmission or an electric motor.

3. The zero turn mower of claim 1, wherein the operator input corresponding to a deactivation of the cruise control mode comprises shifting the pair of motion control levers to a park position, actuating an input device coupled to the pair of motion control levers, or actuating a park brake.

4. The zero turn mower of claim 1, further comprising an operator interface for receiving the operator input.

5. The zero turn mower of claim 4, wherein the operator interface comprises at least one of a display coupled to the zero turn mower and a button coupled to one or more of the pair of motion control levers.

6. The zero turn mower of claim 5, wherein the display is configured to receive the operator input to increment or decrement the speed.

7. The zero turn mower of claim 1, further comprising an electric linear actuator that is coupled to a hydrostatic valve that controls the rear drive wheel, the electric linear actuator is in communication with the controller and when the controller receives an operator input corresponding to an activation of a cruise control mode, the current hydrostatic valve position is locked.

8. A zero turn mower comprising:

a pair of motion control levers, each lever coupled to a drive that rotates a rear drive wheel at a velocity corresponding to the fore and aft position of the lever;

a pair of front wheels that are pivoted to steering angles corresponding to any difference between the fore and aft positions of the pair of motion control levers;

a position sensor positioned to provide a signal based on the fore and aft position of the pair of motion control levers; and a zero turn mower cruise control system comprising a controller configured to:

receive the signal;

receive an operator input corresponding to an activation of a cruise control mode;

maintain the velocity of each rear drive wheel at a current velocity for each rear drive wheel;

receive an updated position of the pair of motion control levers from the position sensor after a change in the fore and aft position of at least one of the pair of motion control levers from a neutral position;

maintain the velocity of each rear drive wheel at an updated velocity for each rear drive wheel until the pair of motion control levers are returned to the neutral position and then maintain the velocity of each rear drive wheel at the current velocity; and receive an operator input corresponding to a deactivation of the cruise control mode and cease maintaining the velocity.

9. The zero turn mower of claim 8, wherein the operator input corresponding to a deactivation of the cruise control mode comprises shifting the pair of motion control levers to a park position, actuating an input device coupled to the pair of motion control levers, or actuating a park brake.

10. The zero turn mower of claim 8, further comprising an operator interface for receiving the operator input.

11. The zero turn mower of claim 10, wherein the operator interface comprises at least one of a display coupled to the zero turn mower and a button coupled to one or more of the pair of motion control levers.

12. The zero turn mower of claim 11, wherein the display is configured to receive the operator input to increment or decrement a speed.

13. The zero turn mower of claim 8, further comprising an electric linear actuator that is coupled to a hydrostatic valve that controls the rear drive wheel, the electric linear actuator is in communication with the controller and when the controller receives an operator input corresponding to an activation of a cruise control mode, the current hydrostatic valve position is locked.

14. A method of operating a zero turn mower cruise control system of a zero turn mower, the method comprising:

receiving a signal from a position sensor indicative of a fore and aft position of a pair of motion control levers, each lever coupled to a drive that rotates a rear drive wheel at a velocity corresponding to the fore and aft position of the lever;

receiving an operator input corresponding to an activation of a cruise control mode;

maintaining the velocity of each rear drive wheel at a current velocity for each rear drive wheel;

receiving a signal from the position sensor indicative of an updated position of the pair of motion control levers after a change in the fore and aft position of at least one of the pair of motion control levers from a neutral position;

maintaining the velocity of each rear drive wheel at an updated velocity for each rear drive wheel until the pair of motion control levers are returned to the neutral position and then maintain the velocity of each rear drive wheel at the current velocity; and receiving an operator input corresponding to a deactivation of the cruise control mode and ceasing to maintain the velocity.

15. The method of claim 14, wherein the receiving an operator input corresponding to a deactivation of the cruise control mode comprises shifting the pair of motion control levers to a park position, actuating an input device coupled to the pair of motion control levers, or actuating a park brake.

16. The method of claim 15, wherein the operator input is received via an operator interface, which comprises at least one of a display coupled to the zero turn mower and a button coupled to one or more of the pair of motion control levers.

17. The method of claim 16, further comprising incrementing or decrementing a speed of a rear drive wheel via the display.

18. The method of claim 14, further comprising providing an electric linear actuator that is coupled to a hydrostatic valve that controls the rear drive wheel, the electric linear actuator is in communication with a controller and when the controller receives an operator input corresponding to an activation of a cruise control mode, the current hydrostatic valve position is locked.

19. The method of claim 14, wherein only a direction of the velocity of each rear drive wheel is maintained.

* * * * *